(12) United States Patent
Carter et al.

(10) Patent No.: US 11,004,328 B2
(45) Date of Patent: May 11, 2021

(54) APPARATUS AND METHODS FOR ALERT MANAGEMENT IN PROCESS CONTROL INSTRUMENTATION

(71) Applicant: Fisher Controls International LLC, Marshalltown, IA (US)

(72) Inventors: Perry Keith Carter, Ames, IA (US); Kenneth Eugene Hall, Jr., Ankeny, IA (US)

(73) Assignee: Fisher Controls International LLC, Marshalltown, IA (US)

(*) Notice: Subject to any disclaimer, the term of this patent is extended or adjusted under 35 U.S.C. 154(b) by 0 days.

(21) Appl. No.: 16/366,667

(22) Filed: Mar. 27, 2019

(65) Prior Publication Data

US 2020/0312122 A1 Oct. 1, 2020

(51) Int. Cl.
*G08B 29/18* (2006.01)

(52) U.S. Cl.
CPC .................................. *G08B 29/18* (2013.01)

(58) Field of Classification Search
CPC .. G05B 23/027; G05B 23/0283; G06Q 10/20; G08B 21/24; G08B 5/222; H04L 41/06; H04L 41/0636; H04L 41/064; H04L 41/065; H04L 41/0681
See application file for complete search history.

(56) References Cited

U.S. PATENT DOCUMENTS

| | | | |
|---|---|---|---|
| 7,114,516 B2 | 10/2006 | Ito | |
| 2002/0163427 A1* | 11/2002 | Eryurek | G05B 23/027 340/500 |
| 2012/0306620 A1 | 12/2012 | Karaffa et al. | |
| 2013/0035774 A1 | 2/2013 | Warren et al. | |
| 2014/0250153 A1 | 9/2014 | Nixon et al. | |
| 2016/0163183 A1* | 6/2016 | Ganguly | H04L 41/064 340/501 |
| 2017/0063709 A1* | 3/2017 | Smith | H04L 47/70 |

* cited by examiner

*Primary Examiner* — Omeed Alizada
(74) *Attorney, Agent, or Firm* — Hanley, Flight & Zimmerman, LLC

(57) ABSTRACT

Apparatus and methods for alert management in instrumentation are disclosed. An example method includes generating a set of alerts within a process control instrument, processing the set of alerts to compare the set of alerts to known combinations of alerts, determining if one of the known combinations of alerts matches the set of alerts based on the comparison of the set of alerts to the known combinations of alerts, and identifying a recommended action instruction based on the determination.

20 Claims, 9 Drawing Sheets

| | ALERT | RECOMMENDED ACTION | | | | | | |
|---|---|---|---|---|---|---|---|---|
| | | A | B | C | D | E | F | G |
| 1 | Supply Pressure High | | | | | x | | |
| 2 | Supply Pressure Low | | | | | | 6 | 2 |
| 3 | Drive Signal High | | | | | x | 4 | 4 |
| 4 | Drive Signal Low | | x | | | | | |
| 5 | Input Current Stable | x | | | | x | 1 | 1 |
| 6 | Input Current Changing | | x | x | x | | | |
| 7 | Travel Changing | x | x | | x | | 3 | 3 |
| 8 | Travel Stable | | | | x | x | | |
| 9 | Actuator Pressure Changing | x | x | x | x | | 2 | 5 |
| 10 | Actuator Pressure Low | | | | | x | | |
| 11 | Travel Deviation High | | | x | x | x | 5 | 6 |
| 12 | Travel Deviation Low | | x | | | | | |

| | | |
|---|---|---|
| 706 | A | Retune the instrument to stabilize the output |
| 708 | B | Tighten the valve packing |
| 710 | C | Check the valve trim for wear or plugging |
| 712 | D | Check the instrument mounting integrity |
| 714 | E | Replace the instrument pneumatic module (plugged) |
| 716 | F | Repair pneumatics to actuator |
| 718 | G | Repair supply pressure |

FIG. 7

APPARATUS AND METHODS FOR ALERT MANAGEMENT IN PROCESS CONTROL INSTRUMENTATION

FIELD OF THE DISCLOSURE

This disclosure relates generally to process control systems and, more particularly, to apparatus and methods for alert management in process control instrumentation.

BACKGROUND

Process control systems typically include instrumentation positioned throughout a plant to enable collection of data for purposes of monitoring and troubleshooting processes. Data collection typically involves measurements made by sensors, including parameters such as pressure, flow rate, temperature, weight, density, velocity, etc. Changes in these measured parameters, such as deviations from a setpoint value, can trigger an alert. Alert management systems are an important part of managing process control instrumentation to identify and address any malfunctions through the processing of alert information. However, the number of alerts initiated in a process control system can be overwhelming to the end user, causing desensitization and making it difficult to recognize actions needed to address the underlying cause of the problem in the process control system.

SUMMARY

An example method for alert management in process control instrumentation includes generating a set of alerts within a process control instrument, processing, by the process control instrument, the set of alerts to compare the set of alerts to known combinations of alerts, determining, by the process control instrument, if one of the known combinations of alerts matches the set of alerts based on the comparison of the set of alerts to the known combinations of alerts, and identifying, by the process control instrument, a recommended action instruction based on the determination.

An example process control instrument for alert management includes an alert manager to generate a set of alerts within a process control instrument, process the set of alerts to compare the set of alerts to known combinations of alerts and determine if one of the known combinations of alerts matches the set of alerts based on the comparison of the set of alerts to the known combinations of alerts, and a recommended action generator to identify a recommended action instruction based on the determination.

An example non-transitory computer readable storage medium includes instructions that, when executed, cause a machine to at least generate a set of alerts within a process control instrument, compare the set of alerts to known combinations of alerts, determine if one of the known combinations of alerts matches the set of alerts based on the comparison of the set of alerts to the known combinations of alerts, and identify a recommended action instruction based on the determination.

BRIEF DESCRIPTION OF THE DRAWINGS

FIG. 7 is a schematic of an example data table used for alert management in accordance with the teachings of this disclosure.

DETAILED DESCRIPTION

Figure 1:
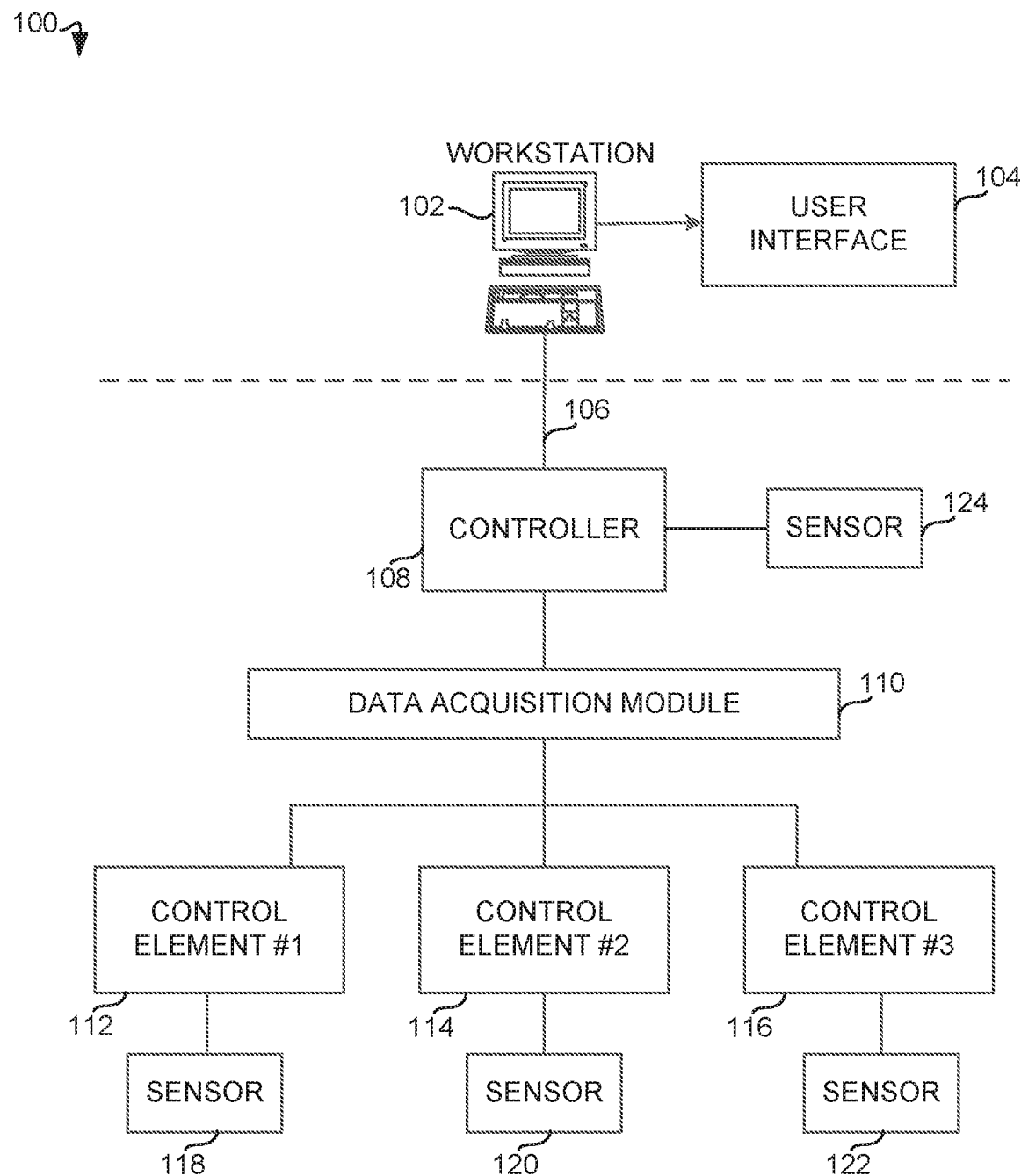
FIG. 1 is a diagram of an example process control system within which the teachings of this disclosure may be implemented.

Process control systems typically implement instrument-based alerts for purposes of monitoring instrument-related events that indicate problems or inconsistencies with a process device and process alerts that indicate problems or inconsistencies with a control loop. The detection of process and device issues in a timely manner can prevent reduced quality production, safety incidents, and shutdowns resulting from equipment malfunction and process deviations in continuous, batch, semi-batch, and discrete processes. Management of alert systems is therefore vital for chemical, petrochemical, pharmaceutical, power generation, pipeline, refining, mining and metal production, and other industries relying on modern control systems incorporating alert functionality. Taking corrective actions in an efficient manner to mitigate problems triggering the alerts is dependent upon timely and accurate assessment of the alerts and identification of their potential causes.

While alerts indicate abnormal operating conditions or emergencies, other non-alert information for operators (such as notifications) can be silenced or ignored during the presence of alerts. Current implementations of alert systems present alert management challenges, including situations that generate a large number of alerts that can overwhelm a process control system operator. Over time, operators can become desensitized, presenting a risk that the operators will not notice critical alerts when they occur.

Average alert rates vary widely. While 6-12 alerts per hour may be manageable, significantly higher rates are more common across process industries and are too demanding on process control plant operators or other users. A typical process plant may produce 1,000-2,000 entries in activity logs over a twenty-four hour period, including alert activations, alert clearings, operator actions, alert acknowledgments, and system status events. Under upset conditions, alert floods can cause alert activation rates of 70-180 alerts per minute, which can correspond to 1-3 alert activations per second. Over time, even under normal conditions, alerts can become a nuisance, causing the operator to ignore the alerts or disable equipment associated with the generation of alerts.

Various types of alerts exist in process control systems. These alerts can include: chattering alerts, alerts that do not require any response, stale alerts, and alerts with incorrectly assigned priorities. Chattering alerts repeat excessively over a short period of time and are associated with instrument maintenance or alert design issues that cause the alert to repeatedly transition between alert and non-alert states. Alerts not requiring a response include stale alerts, which go into alert mode and do not return to a normal state for an extended period of time. For example, any alert in an active mode is known as a standing alert. Such alerts may be reviewed by an operator every hour. A stale alert is active for a period of time (e.g., greater than 24 hours), and may be reviewed daily by a shift supervisor. Alerts are not always prioritized based on their urgency, making them less meaningful and leading the operator to potentially take incorrect sequences of action when multiple alerts are triggered. Certain types of alerts, such as chattering alerts and stale alerts, can contribute to a higher frequency of alerts to which an operator is exposed at any one time. For example, operators indicate that on average 15-200 stale alerts can be displayed on an alert summary list continuously for more than 24 hours, significantly contributing to the total number of alerts displayed to the process control system operator due to their prolonged activity.

Improved alert management leads to improved operation and reduced maintenance and insurance costs because equipment can be better maintained and less stressed when proper corrective or preventative actions are taken by operators. Improvements in alert management have been reported to result in a 5-15% sustained reduction of unplanned maintenance costs and contribute to significant reductions in risk operations insurance when alert improvements are compliant with established standards of operation.

Alerts are set in process control instruments based on an instrument event, such as changes in supply pressure, actuator pressure, and flow volume. Once an instrument event threshold is reached, an event alert is activated and communicated via an industrial communication protocol such as Highway Addressable Remote Transducer (HART), Wireless HART, Foundation Fieldbus, or Profibus to a control system or asset management host. The asset management host utilizes instrument-specific device descriptions (DDs) to interpret active event alerts and provide an appropriate recommendation based on those alerts. In most cases, multiple event alerts may be active, but only one recommended action is needed. Respective control system or asset management hosts attempt to manage the complexity, leading to host vendor-specific solutions that vary widely and which may ignore relevant instrument information that is determined valuable by the instrument vendor in providing a recommended action.

Examples disclosed herein overcome the difficulties associated with managing multiple active event alerts by enabling the process control instrument logic to process the active alerts and broadcast recommended actions based on one or more of the active event alerts. By matching active event alerts to a recommended action, the process control system operator is not alerted to every alert that is recorded. Instead, the operator is provided with recommended actions that help to address one or more of the active alerts at once, as opposed to being provided with recommended actions that address each specific active alert one at a time. Example methods disclosed herein describe action alerts that address the issue of alert overload at the source (e.g., the instrument) for application in any control or asset management system. The teachings disclosed herein can be implemented in any industry that relies on automated process controllers to improve management of alerts to prevent end-user fatigue and desensitization due to alert overloads, while also streamlining the recommendation process to maximize the time allowable for mitigating any arising malfunctions and process deviations in the system.

Example methods disclosed herein enable replacement of existing event-driven instrument alerts with action-driven instrument alerts. For example, current process control instruments are used to determine active alerts and broadcast these alerts, followed by the display of these alerts by the user interface to the process control system operator. Example methods disclosed herein describe process control instrument logic used to process the active alerts and match the alerts to recommended actions that are broadcast by the instrument and displayed to the user by the user interface. Given that most operators experience too many alerts, any alert that does not require an action is distracting and leads to a loss of productivity. The example methods disclosed herein enable improved operator efficiency and increased attention to responding to alerts that require actions, thereby decreasing the likelihood of operators not responding to alerts in a timely manner.

FIG. 1 is a diagram of an example process control system 100 within which the teachings of this disclosure may be implemented. The process control system 100 includes a workstation 102 with a user interface 104. The workstation 102 is communicatively coupled to a controller 108 via a bus or local area network (LAN) 106, which is commonly referred to as an Area Control Network (ACN). The LAN 106 may be implemented using any desired communication medium and protocol. For example, the LAN 106 may be based on a hardware or wireless Ethernet communication protocol. However, any other suitable wired or wireless communication medium and protocol could be used. The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 108 to communicate with other devices or systems using any desired communication media (e.g., wireless, hardwired, etc.) and protocols (e.g., HTTP, SOAP, etc.).

The example controller 108 may be configured to perform one or more process control routines and/or functions operating as one or more control loops that have been generated by a system engineer or other system operator using, for example, the workstation 102 or any other workstation and which have been downloaded to and instantiated in the controller 108. The example process control system 100 includes an Input/Output (I/O) data acquisition module 110, one or multiple control elements (designated as reference numerals 112, 114, and 116), and one or more sensors (designated as reference numerals 118, 120, 122, 124). For example, the control elements 112, 114, and 116 may be Fieldbus compliant valves, actuators, sensors, etc., such that the control elements 112, 114, and 116 communicate via a digital data bus using the Fieldbus communication protocol. The control elements 112, 114, and 116 can also be Profibus, HART, or AS-i compliant devices that communicate via the data bus using the Profibus, AS-i and HART communication protocols. In some example implementations, the control elements 112, 114, and 116 can communicate information using analog communications or discrete communications instead of digital communications.

The controller 108 of the example process control system 100 of FIG. 1 is communicatively coupled to the Input/Output (I/O) data acquisition module 110. The data acquisition module 110 may be communicatively coupled to I/O cards (not shown in FIG. 1). The I/O cards may be communicatively coupled to the control elements 112, 114, 116 and the sensors 118, 120, 122. The controller 108 receives input signals from the I/O data acquisition module 110 and processes those input signals through one or more control loops (not shown in FIG. 1) operating within the controller 108. In this example, the sensor 124 communicates directly with the controller 108, such that the sensor 124 monitors a value related to the process control loop set point. For example, the sensor 124 can act as a primary sensor to allow for process control loop-wide control versus localized control of the control elements 112, 114, and 116 provided by the sensors 118, 120, and 122. In a process control loop, a process variable (e.g., pressure) is controlled or maintained based on a setpoint or established reference value. In the example process control system 100 of FIG. 1, a process control variable such as pressure is measured using one or more sensors (e.g., the sensors 118, 120, 122, 124) or transducers. A signal measured by the sensors is output and sent to the controller 108 via the I/O data acquisition module 110. An error detector (not shown in FIG. 1, in the controller 108) compares the process variable (e.g., a pressure value) to an established reference value (e.g., a setpoint). Based on the error signal determined by the controller 108, a control action is initiated by the controller 108 to alter the process until the process variable (e.g., pressure) converges to the desired setpoint value.

The I/O data acquisition module 110 of the example process control system 100 of FIG. 1 receives input signals that have propagated through the process control system 100 originating from the control elements 112, 114, and 116. The input signals may include analog input data signals, discrete input data signals, and/or digital I/O data signals. After receiving input signals from the control elements 112, 114, and 116, the I/O data acquisition module 110 determines which input signals are to be forwarded to the controller 108. Alternatively, the I/O data acquisition module 110 may forward input signals to the controller 108 upon receiving a request from the controller 108. In some examples, the I/O data acquisition module 110 may receive varying amounts of input signals, output signals, messages and other types of communications. By managing which input signals are forwarded to the controller 108, the data acquisition module 110 can improve network efficiency within the process control system 100. The data acquisition module 110 also receives output signals originating from the controller 108, which the data acquisition module 110 may forward to the respective control elements 112, 114, and 116.

In the example process control system of FIG. 1, the control elements 112, 114, and 116 may include, for example, a valve (e.g., control element 112) to control fluid flow through a pipe and a corresponding sensor (e.g., sensor 118) to measure a pressure of the fluid within the pipe. The valve (e.g., the control element 112) may include any type of process control valve and the sensor (e.g., the sensor 118) may include any type of sensor for pressure, temperature, level, flow, etc. The sensor sends the signal to the I/O data acquisition module 110. In some examples, the sensor may send the input signal in response to a request from the I/O data acquisition module 110. The controller 108 receives the input signal and processes the signal via a control loop. The control loop uses the input signal to calculate a control action for the signal. The controller 108 then transmits the control action via an output signal to the valve to cause an appropriate change in the fluid flow.

Figure 2:
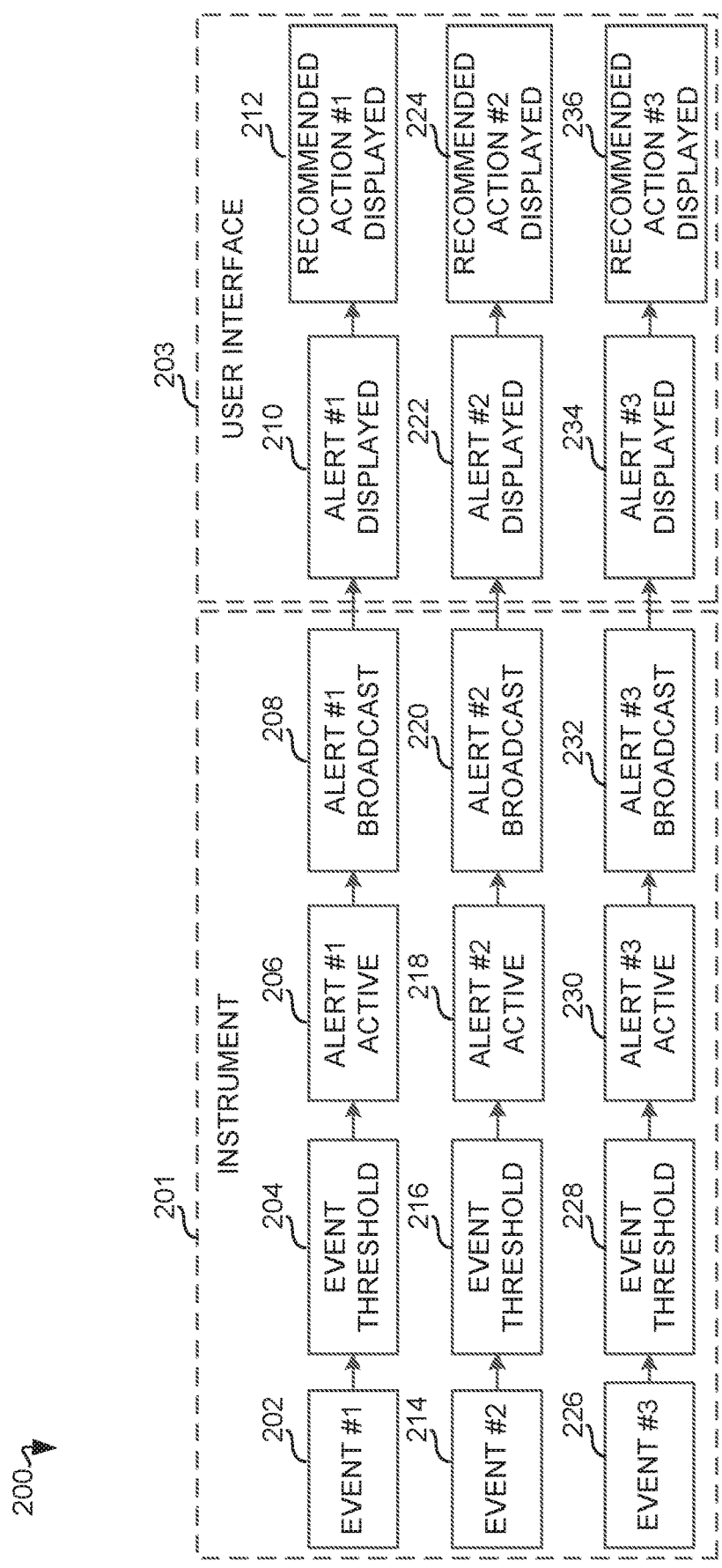
FIG. 2 is a block diagram illustrating a known methodology of alert management with a user interface displaying alerts and recommended actions.

FIG. 2 is a block diagram illustrating a known methodology of alert management 200. An example process control instrument 201 processes one or more events (designated as reference numerals 202, 214, 226). For example, the event 202 may correspond to one or multiple changes in process control variables (e.g., pressure). Respective event thresholds (designated as reference numerals 204, 216, 228) for each of the events 202, 214, 226 may be defined as a set number of events (e.g., changes in pressure) that need to occur for respective alerts (designated as reference numerals 206, 218, 230) to be activated. Respective alert broadcasts 208, 220, and 232 are initiated in response to the activation of the alerts 206, 218, and 230. A user interface 203 is used to output respective alert displays 210, 222, and 234 in response to the alert broadcast 208, 220, and 232 that occur in the example process control instrument 201. Once the alerts are displayed, the user interface 203 also displays recommended actions 212, 224, and 236 that correspond respectively to the displayed alerts 210, 222, and 234. As a result, the process control system operator sees recommended actions 212, 224, and 236 displayed for every alert 210, 222, and 234 generated by the process control instrument 201.

For example, if the sensor 118 of FIG. 1 detects a decrease in supply pressure to the control element 112, this generates an event, such as the event 202 of FIG. 2. Given that supply pressure can fluctuate over time, the decrease in supply pressure may be monitored and additional recorded occurrences of the changes in pressure can, over time, trigger the event threshold 204. As a result, an alert, such as the alert 206 of FIG. 2, is activated. Once the alert 206 is broadcast at 208, it is displayed at 210 to the process control system operator, indicating that there is a fluctuation of supply pressure at the control element 112 of FIG. 1. Additionally, the recommended action 212 displayed to the process control operator can include checking the control element 112 for any malfunction or checking for areas of concern downstream of the control element 112. In some examples, the controller 108 of FIG. 1 may have initiated an alteration in the process to allow the process variable (e.g., supply pressure) to converge to the setpoint value. In some examples, the active alert 206 may become inactive once the process variable has stabilized.

Figure 3:
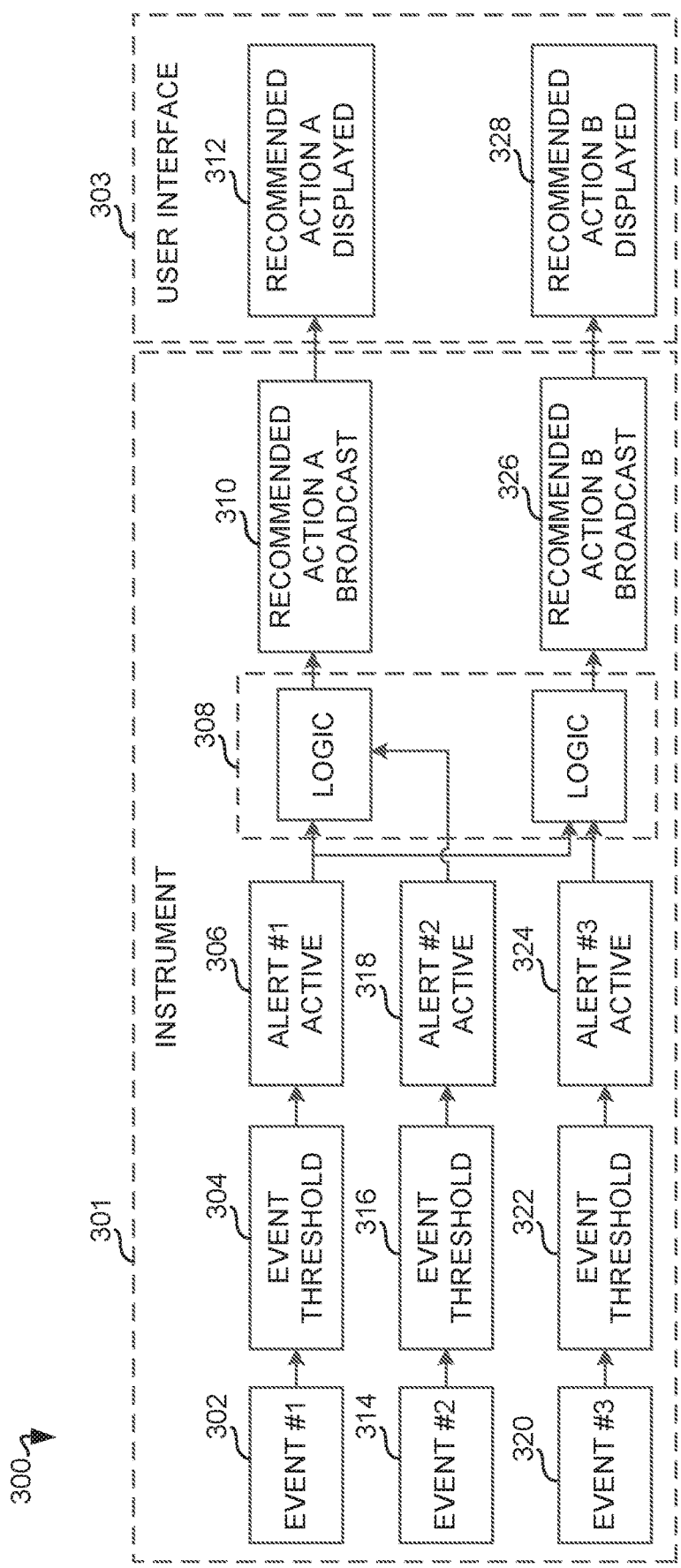
FIG. 3 is a block diagram illustrating an example process control instrument to process alerts and generate recommended actions in accordance with the teachings of this disclosure.

FIG. 3 is a block diagram 300 illustrating an example process control instrument to process alerts and generate recommended actions in accordance with the teachings of this disclosure. An example process control instrument 301 processes one or more events (designated as reference numerals 302, 314, 320). For example, the event 302 may correspond to one or multiple changes in a process control variable (e.g., pressure). Respective event thresholds (designated as reference numerals 304, 316, 322) for the events 302, 314, 320 may be assigned as a predetermined number of events (e.g., changes in pressure) that need to occur for alerts (designated as reference numerals 306, 318, 324) to be activated. Process control instrument logic 308 processes the set of alerts 306, 318, 324 to determine which alerts are interrelated.

For example, the alert 306 may be generated due to a change in an input current at the control element 112 of FIG. 1, the alert 318 may be generated due to a change in the actuator pressure at the control element 114 of FIG. 2, and the alert 324 may be generated due to a supply pressure increase associated with the control element 112. The process control instrument logic 308 may determine that the active alerts 306 and 318 are related and indicate one malfunction in the process control system, while the logic 308 may also determine that the active alerts 306 and 324 are also related and may indicate a different malfunction in the process control system. As a result, a recommended action 310 is broadcast that presents an action that can resolve the active alerts 306 and 318, while a recommended action 326 is broadcast that can resolve the active alerts 306 and 324. A user interface 303 displays recommended actions 312 and 328 to the process control system operator, where the recommended actions 312 and 328 are based on the recommended actions 310 and 326 that were broadcast by the process control instrument 301. In some examples, the process control instrument logic 308 may cause the recommended actions 312 and 328 displayed to be updated when one or more of the alerts 306, 318, and 324 show a change in status, such when one or more of the alerts is no longer active. In some examples, the operator, having additional information not available to the process control instrument logic 308, may adjust the recommended actions by assigning priority to one action 312 over the other action 328. In some examples, the recommended actions 312 and 328 may be displayed in order of priority on the user interface 303 based on the alert management logic 308 determination that one or more of the recommendations generated should be addressed by the operator first to eliminate the most likely causes of the alerts 306, 318, and 324.

Figure 4:
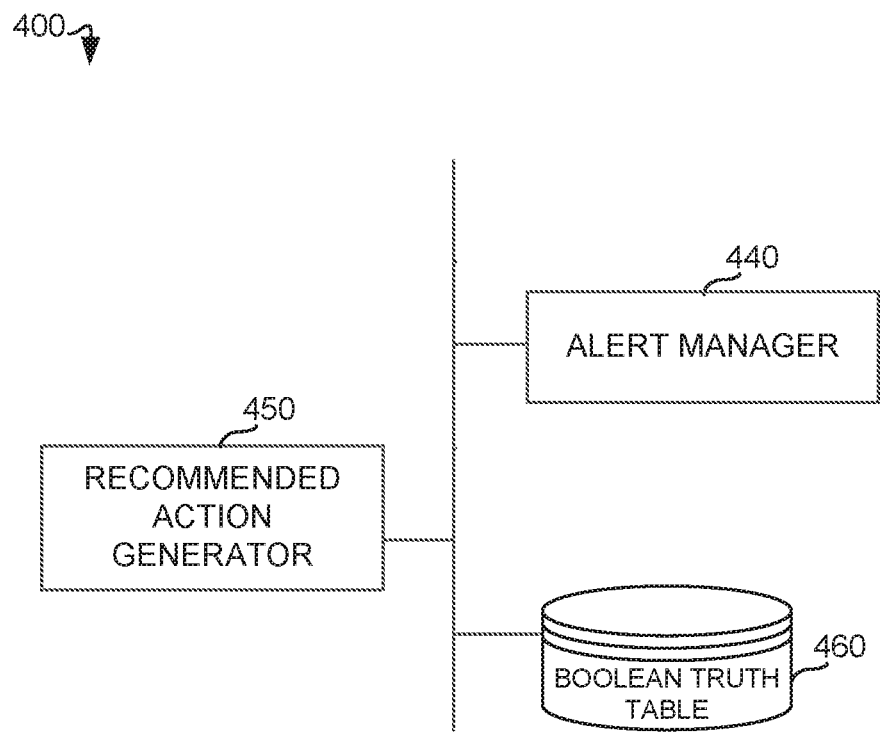
FIG. 4 is a block diagram of an example process control instrument logic for use in alert management in accordance with the teachings of this disclosure.

FIG. 4 is a block diagram 400 of the example process control instrument logic 308 of FIG. 3 for use in alert management in accordance with the teachings of this disclosure. The process control instrument logic 308 includes an example alert manager 440, an example recommended action generator 450, and an example Boolean truth table 460. The example alert manager 440 generates and manages the set of process control or device alerts 306, 318, and 324 input into the instrument logic 308 of FIG. 3. For example, the alert manager 440 can categorize the generated active alerts 306, 318, and 324 based on their potential interrelation. For example, if two of the alerts 306 and 324 are generated at the control element 112 of FIG. 1, the alert manager 440 may determine that these action alerts may have been generated as a result of the same malfunction in the process control system. The alert manager 440 further compares the available set of alerts to known combinations of alerts in order to determine whether the available set of alerts generated by the process control instrument matches a known set of alerts which is already available to the process control instrument logic 308. The alert manager 440 identifies a recommended action instruction based on whether there is a match between the set of generated alerts and a set of known alerts. The recommended action generator 450 generates new recommended action instructions for the process control system operator to address the active alerts, such as the active alerts 306, 318, and 324 of FIG. 3. For example, the recommended action generator 450 may arrange the recommended actions 312 and 328 to be displayed in a specific order according to how the logic 308 prioritizes the recommendations based on the processed active alerts 306, 318, and 324. The process control instrument logic 308 also includes the example Boolean truth table 460. The Boolean truth table 460 is used to match alerts, such as the example alerts 306, 318, and 324 with recommended actions, such as the recommended actions 312 and 328 of FIG. 3. For example, the combination of alerts and their temporal occurrence may cause the Boolean truth table 460 to match the alerts to a specific recommended action. In some examples, the temporal occurrence of the alerts and their combination may not influence the recommended action, but rather result in a specific recommendation that is independent of the sequence of alerts.

While an example manner of implementing the process control instrument logic 308 of FIG. 3 is illustrated in FIG. 4, one or more of the elements, processes and/or devices illustrated in FIG. 4 may be combined, divided, re-arranged, omitted, eliminated and/or implemented in any other way. Further, the example alert manager 440, the example recommended action generator 450, the example Boolean truth table 460 and/or, more generically, the example process control instrument logic 308 of FIG. 3 may be implemented by hardware, software, firmware and/or any combination of hardware, software and/or firmware. Thus, for example, any of the example alert manager 440, the example recommended action generator 450, the example Boolean truth table 460 and/or, more generically, the example process control instrument logic 308 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example alert manager 440, the example recommended action generator 450, and/or the example Boolean truth table 460 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control instrument logic 308 of FIG. 3 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
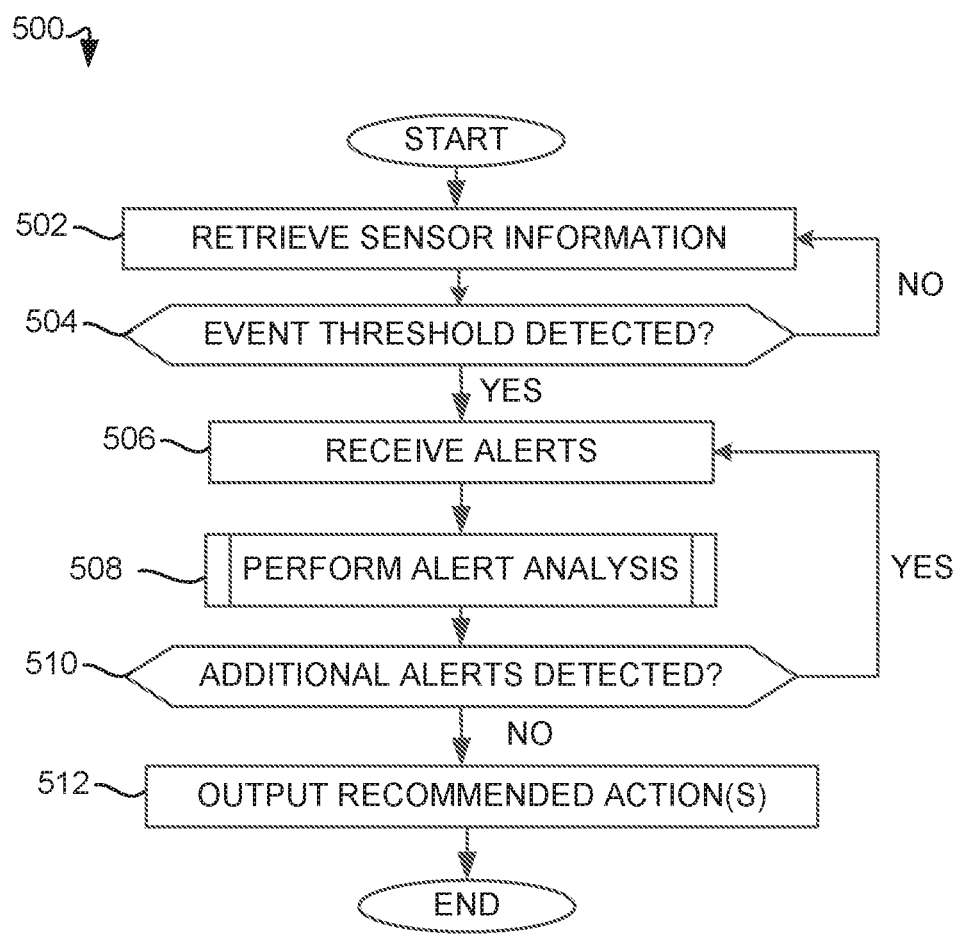
FIG. 5 is a flowchart representative of machine-readable instructions which may be executed to implement the example process control instrument in FIG. 3.
Figure 6:
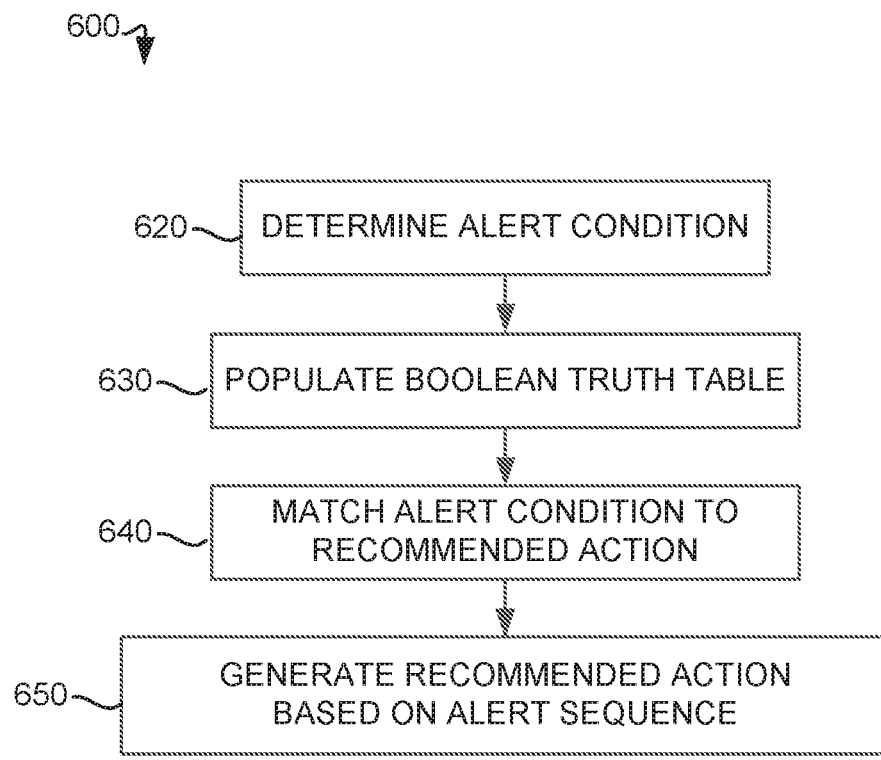
FIG. 6 is a flowchart representative of machine-readable instructions which may be executed to implement the example process control instrument logic in FIG. 4.

Flowcharts representative of example machine readable instructions for implementing the process control instrument of FIG. 3 and process control instrument logic of FIGS. 3-4 are shown in FIG. 5 and FIG. 6, respectively. The machine-readable instructions may be one or more executable programs or portion(s) of an executable program for execution by a processor such as the processor 906 shown in the example processor platform 900 discussed below in connection with FIGS. 5-6. The program may be embodied in software stored on a non-transitory computer readable storage medium such as a CD-ROM, a floppy disk, a hard drive, a digital versatile disk (DVD), a Blu-ray disk, or a memory associated with the processor 906, but the entire program and/or parts thereof could alternatively be executed by a device other than the processor 906 and/or embodied in firmware or dedicated hardware. Further, although the example program is described with reference to the flowcharts illustrated in FIGS. 5-6, many other methods of implementing the example process control instrument 301 and example process control instrument logic 308 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 5 and/or 6 may be implemented using executable instructions (e.g., computer and/or machine readable instructions) stored on a non-transitory computer and/or machine readable medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 5 is a flowchart 500 representative of machine-readable instructions which may be executed to implement the example process control instrument in FIG. 3. At block 502, sensor information for example sensors 118, 120, and 122 of FIG. 1 is retrieved for control elements 112, 114, and 116, respectively. For example, sensor information may include supply pressure and drive signal. The sensors 118, 120, and 122 help detect inconsistencies and deviations from desired or acceptable values established for device parameters such as supply pressure, input current, and/or actuator pressure. Any changes in the system parameters are registered as events, such as the example events 302, 314, and 320 of FIG. 3. If a particular system parameter shows continuous deviations from the desired value, this can result in detection of an event threshold. Once an event threshold (e.g., event threshold 304, 316, or 322 of FIG. 3) is detected at block 504 of FIG. 5, the process control instrument receives, at block 506, the alerts (e.g., alerts 306, 318, and 324 of FIG. 3) generated as a result of the detected event thresholds. At block 508, the process control instrument 301 of FIG. 3 performs alert analysis using the process control instrument logic 308, which includes the alert manager 440, the recommended action generator 450, and the Boolean truth table 460 of FIG. 4. For example, the alert analysis includes determining, using the alert manager 440, which active alerts 306, 318, and 324 may be interrelated to provide the recommended actions 310 and 326 that can address steps to be taken to mitigate one or several active alerts at once. At block 510, any additional alerts detected are included in the process control instrument logic 308 for purposes of processing the alerts to yield the recommended actions. If no additional alerts are detected at block 510, recommended actions are broadcast at block 512 (e.g., recommended action broadcasts 310, 326) in the process control system instrument 301 using the recommended action generator 450 of FIG. 4.

FIG. 6 is a flowchart 600 representative of machine-readable instructions which may be executed to implement the example process control instrument logic 308 in FIG. 4. Once active alerts 306, 318, and 324 are received by the process control instrument logic 308, alert conditions are determined at block 620. For example, based on the active alerts generated by the system, the alerts are assigned a specific descriptive indicator that indicates the system parameter that is deviating from a setpoint and the specifics of the deviation. For example, an alert may be generated because of a deviation in the supply pressure from a setpoint. The alert condition may be used to determine whether the supply pressure is too high or too low. Once the alert conditions are determined at block 620, the Boolean truth table 460 of FIG. 4 is populated at block 630 of FIG. 6. The Boolean truth table 460 includes the alert conditions which are matched, at block 640, to a specific recommended action. In some examples, the Boolean truth table 460 is populated with all of the alert conditions that are generated from alerts which are active in real-time. In some examples, the Boolean truth table 460 is repopulated simultaneously with updated active alerts to provide the process control system operator with the most up-to-date recommendations. In some examples, the sequence of the alert conditions can be a determining factor in the recommended action(s) to be generated by the process control instrument logic 308. In some examples, the Boolean truth table 460 is used to determine whether there is a one-to-one matching correspondence between the alert conditions that are generated in the system and the alert conditions that are already known based on previously generated alerts or previously input alert combinations. Alert conditions that have a one-to-one matching correspondence to the available set of alert conditions known to the process control instrument logic 308 are then matched to recommended actions at block 640, and the recommended actions are generated, at block 650, based on the alert sequence.

FIG. 7 is a schematic of an example data table 700 used for alert management in accordance with the teachings of this disclosure. The data table 700 is representative of the Boolean truth table 460 of FIG. 4, part of the process control instrument logic 308 of FIG. 3, used to determine alert conditions 702 and match the determined alert conditions to recommended actions 704 for the process control system operator. The data table 700 includes the known combinations of alerts that are available to the process control instrument logic 308 and which are used to check for a one-to-one matching correspondence to the set of alerts generated by the process control system. For example, the alert conditions 702 that are based on active alerts (such as the active alerts 306, 318, and 324 of FIG. 3) may include the example alert conditions 1-12 listed in the example data table 700. The example alert conditions 702 can include, but are not limited to, high or low supply pressure, high or low drive signal, stable or changing input current, changing or stable travel, changing or low actuator pressure, and high or low travel deviation. In some examples, each of the alert conditions 702 is matched to one or more of the recommended actions 704 based on the alert conditions that are active. In some examples, the matching of alert conditions to recommended actions may take into consideration the status of other units of the process control system. Processing a data table such as the data table 700 using the process control instrument logic 308 allows for recommended action instructions to be matched to each set of alert conditions generated by the instrument when the alert conditions are a one-to-one match to an existing set of known alert conditions in the data table 700.

The Boolean truth table 460 may be used to determine whether certain conditions are true or false. For example, if there is an alert related to supply pressure, the Boolean truth table 460 may be used to determine whether the supply pressure is high (true or false) or whether the supply pressure is low (true or false). The example data table 700 is used to match these alert conditions to other alert conditions originating from the process control system. In some examples, the process control instrument logic 308 may be trained to recognize patterns in certain alerts and tie these alerts to potential malfunctions in other areas of the process control system. For example, in the data table 700, an input current may be determined to be stable, while both travel and actuator pressure are changing. The combination of these alerts causes the data table 700 to make a match to respective recommended action instructions, such as the recommended action 706 (e.g., retune the instrument to stabilize the output). In another example, a low drive signal in combination with a changing input current, a changing travel, a changing actuator pressure, and a low travel deviation may result in a match to recommended action 708 (e.g., tighten the valve packing). In another example, a combination of alert conditions that includes a changing input current, a changing actuator pressure, a low travel deviation, including stable travel, may result in a match to the example recommended action 710 (e.g., check the valve trim for wear or plugging). In another example, a combination of alert conditions that include a changing input current, changing travel, changing actuator pressure, and a high travel deviation may result in a match to the example recommended action 712 (e.g., check the instrument mounting integrity). In some examples, the total number of alert conditions that may be combined to determine one or more recommended actions is not limited. For example, more complex malfunctions in a process control system may result in a large number of generated alerts. While in some examples there may be single alerts generated that require single defined courses of action by the process control system operator, in other examples the complexity of the process control system requires the assessment and processing of large quantities of active alerts that can be combined to yield more streamlined recommended actions for the operator to undertake. For example, the combination of a high supply pressure, a high drive signal, a stable input current, a stable travel, a low actuator pressure, and a high travel deviation may be processed to yield a match to a single recommended action 714 (e.g., replace the instrument pneumatic module).

In some examples, the example data table 700 may be used to match the alert conditions 702 to a recommended action or actions 704 based on the sequence of the alert conditions. For example, the alert conditions that are processed may be the same, but their order of occurrence may inform the most appropriate action recommendation. In some examples, several recommended actions may be displayed to the process control operator, but the recommended actions may be prioritized. For example, in the data table 700, the alert conditions at one point in time may include a low supply pressure, a high drive signal, a stable input current, changing travel, changing actuator pressure, and a high travel deviation. However, the sequence of these alert conditions may be used to determine the recommended action(s) given to the process control system operator. For example, if the second alert condition in the presented alert condition set is a changing actuator pressure, followed by a changing travel, a high drive signal, a high travel deviation, and a low supply pressure, the recommended action may be to repair the pneumatics to the actuator (e.g., recommended action 716). In another example, if the second alert action in the presented alert condition set is a low supply pressure, followed by changing travel, a high drive signal, a changing actuator pressure, and a high travel deviation, the altered sequence of the listed action conditions may instead result in the recommendation to repair supply pressure (e.g., recommended action 718). In some examples, given that the alert conditions are the same but their sequence is different, the recommended actions output to the process control system operator may include both recommended actions 716 and 718. In some examples, the recommended actions 716 and 718 may be presented in the order of priority that is determined, by the process control instrument logic 308, to most likely result in the resolution of the active alerts (e.g., the active alerts 306, 318, and 324 of FIG. 3) given the sequence of the alert conditions.

In some examples, the recommended action(s) 704, generated by the process control instrument logic 308 using the recommended action generator 450, may be prioritized based on prior recommended actions that were undertaken to successfully resolve a similar set of alert conditions. In some examples, the process control system operator may manually include a new recommended action in the example data table 700 if the set of recommended actions 704 does not include an alternative recommended action that may be successful in mitigating the active alerts. In some examples, a new recommended action may be generated if none of the existing recommended actions 704 is based on a one-to-one match between the set of generated alerts and the set of known alert combinations. In some examples, the process control system operator may include additional recommended actions in the data table 700 for novel combinations of alert conditions that do not provide a direct match to the set of recommended actions. In some examples, a direct match of the alert conditions to a recommended action may result in only that recommended action being displayed to the process control operator. In some examples, a lack of a direct match of the alert conditions to the set of recommended actions may result in the display of at least one recommended action that most closely matches the set of alert conditions. In some examples, several recommended actions that are most closely matched to the alert conditions may be shown to the process control system operator, the recommended actions being, in some examples, prioritized based on their degree of matching accuracy to the set of process control system alert conditions.

Figure 8:
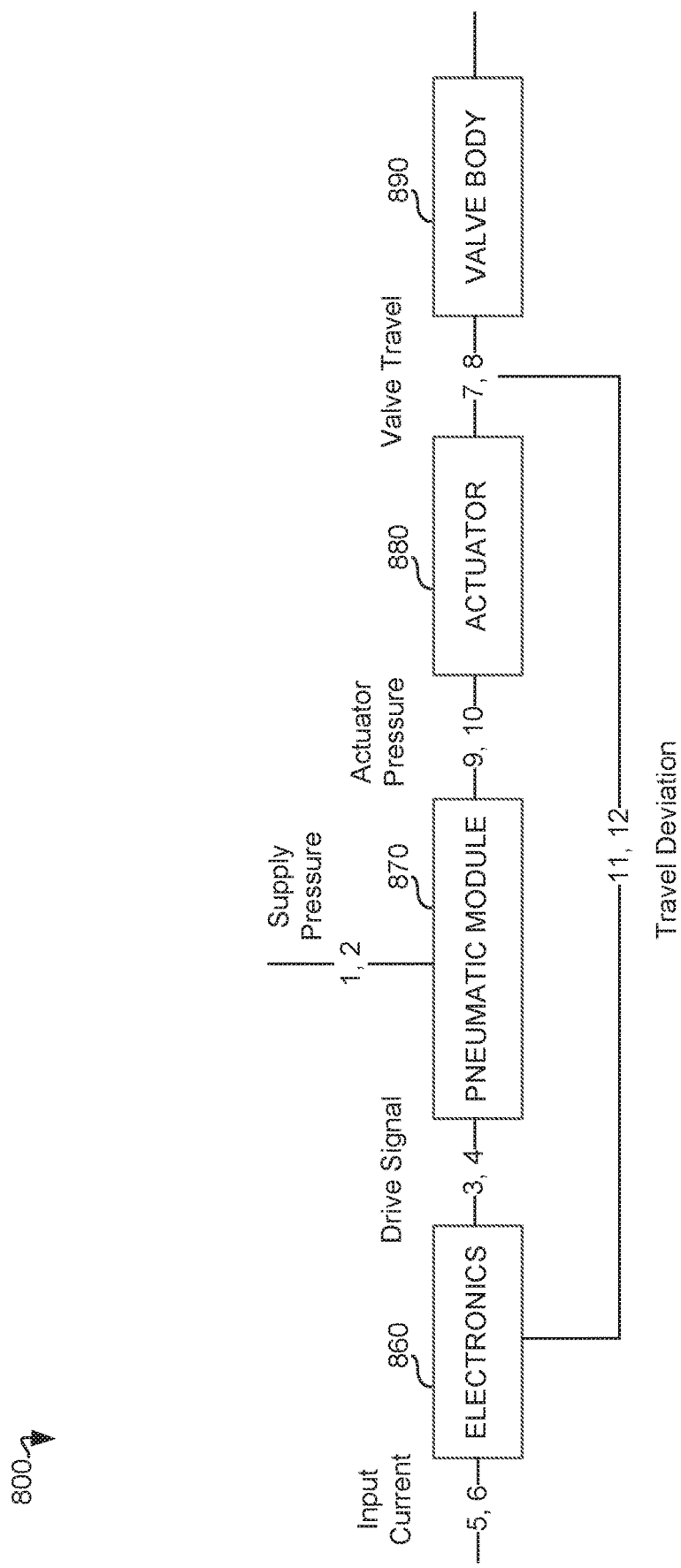
FIG. 8 is a block diagram of sample process control system components and corresponding conditions that may trigger alerts defined in the example alert management data table in FIG. 7.

FIG. 8 is a block diagram 800 of sample process control system components and corresponding conditions that may trigger alerts defined in the example alert management data table 700 in FIG. 7. The examples process control system components include electronics 860, a pneumatic module 870, an actuator 880, and a valve body 890. Process control system parameters that are monitored may include a supply pressure (e.g., high or low supply pressure corresponding to the data table 700 alert conditions 1 and 2), a drive signal (e.g., high or low drive signal corresponding to alert conditions 3 and 4), an input current (e.g., stable or changing input current corresponding to alert conditions 5 and 6), a valve travel (e.g., a changing or stable valve travel corresponding to alert conditions 7 and 8), an actuator pressure (e.g., changing or low actuator pressure corresponding to alert conditions 9 and 10), and a travel deviation (e.g., high or low travel deviation corresponding to alert conditions 10 and 11).

In some examples, active alerts may be present at different system components. For example, valve travel may be changing to the valve body 890, resulting in the alert condition 7 of the data table 700. At the same time, actuator pressure may be changing to the actuator 880, resulting in the alert condition 9 of the data table 700, while the input current to the electronics 860 component may be stable, resulting in the alert condition 5 of data table 700. If, for example, the alert conditions are a match for a recommended action, this recommended action 706 (e.g., retune the instrument to stabilize the output) can be output to the process control system operator. In some examples, the sequence of the changes in the process control system variables influences the recommended action. For example, the recommended action 716 to repair pneumatics to the actuator is made if the following alert conditions are in place in the specified sequence in the example process control system of FIG. 8: the input current to the electronics component 860 is stable (e.g., alert condition 5 of data table 700), the actuator pressure to the actuator 880 begins to change (e.g., alert condition 9), the travel to the valve body 890 begins to change (e.g., alert condition 7), the drive signal to the pneumatic module 870 becomes high (e.g., alert condition 3), travel deviation increases (e.g., alert condition 11), and supply pressure to the pneumatic module 870 becomes low (e.g., alert condition 2). If the alert conditions 2-3, 5, 7, 9 and 11 occur in any other sequence, the recommended action can be different from the recommended action 716 to repair pneumatics to the actuator.

Figure 9:
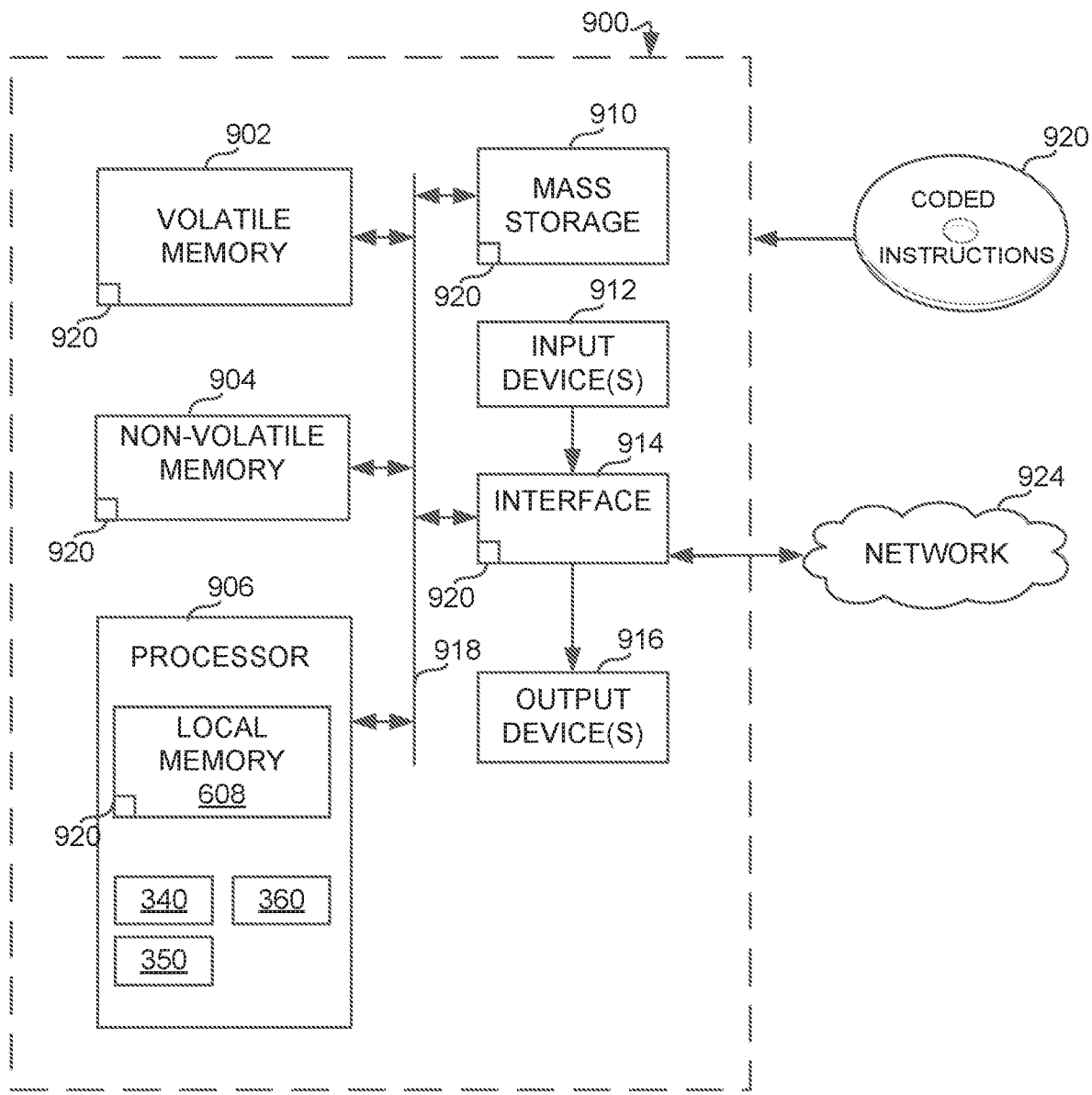
FIG. 9 is a schematic illustration of an example processor platform that may be used and/or programmed to carry out the example methods of FIGS. 5-6 and/or, more generally, to implement the example process control system of FIGS. 1, 3, and 4.

FIG. 9 is a block diagram of an example processor platform 900 capable of executing the instructions of FIGS. 5 and 6 to implement the example process control instrument 301 of FIG. 3. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 906. The processor 906 of the illustrated example is hardware. For example, the processor 906 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 906 implements the alert manager 440, the recommended action generator 450, and the Boolean truth table 460 of the process control instrument logic 308.

The processor 906 of the illustrated example includes a local memory 908 (e.g., a cache). The processor 906 of the illustrated example is in communication with a main memory including a volatile memory 902 and a non-volatile memory 904 via a bus 918. The volatile memory 902 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 904 may be implemented by flash memory and/or any other desired type of memory device. Access to the main memory 902 and 904 is controlled by a memory controller.

The processor platform 900 of the illustrated example also includes an interface circuit 914. The interface circuit 914 may be implemented by any type of interface standard, such as an Ethernet interface, a universal serial bus (USB), a Bluetooth® interface, a near field communication (NFC) interface, and/or a PCI express interface.

In the illustrated example, one or more input devices 912 are connected to the interface circuit 914. The input device(s) 912 permit(s) a user to enter data and commands into the processor 906. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 916 are also connected to the interface circuit 914 of the illustrated example. The output devices 916 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 914 of the illustrated example, thus, typically includes a graphics driver card, a graphics driver chip or a graphics driver processor.

The interface circuit 914 of the illustrated example also includes a communication device such as a transmitter, a receiver, a transceiver, a modem, a residential gateway, a wireless access point, and/or network interface to facilitate exchange of data with external machines (e.g., computing devices of any kind) via a network 924. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 910 for storing software and/or data. Examples of such mass storage devices 910 include floppy disk drives, hard drive disks, compact disk drives, Blu-ray disk drives, redundant array of independent disks (RAID) systems, and digital versatile disk (DVD) drives.

The machine executable instructions 920 of FIGS. 5-6 may be stored in the mass storage device 910, in the volatile memory 902, in the non-volatile memory 904, and/or on a removable non-transitory computer readable storage medium such as a CD or DVD.

Although certain example methods, apparatus and system have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   generating a set of alerts within a process control instrument;
   assigning a descriptive indicator to at least one alert of the set of alerts, the descriptive indicator indicative of a process control system parameter deviating from a setpoint value, wherein a number of deviations from the setpoint value initiates detection of an event threshold, the event threshold a predetermined number of events required for alert activation;
   processing, by the process control instrument, the set of alerts to compare the set of alerts to known combinations of alerts;
   determining, by the process control instrument, if one of the known combinations of alerts matches the set of alerts based on a comparison of the set of alerts to the known combinations of alerts; and
   identifying, by the process control instrument, a recommended action instruction based on the determination.

2. The method of claim 1, wherein processing the set of alerts to compare the set of alerts to the known combinations of alerts includes sequentially comparing each of the alerts composing the set of alerts to each of the alerts composing each of the known combinations of alerts.

3. The method of claim 2, wherein determining if one of the known combinations of alerts matches the set of alerts includes determining if a one-to-one matching correspondence exists between the alerts composing the set of alerts and one of the known combinations of alerts.

4. The method of claim 1, wherein determining if one of the known combinations of alerts matches the set of alerts includes processing, by the process control instrument, a data table that includes the known combinations of alerts.

5. The method of claim 1, further comprising identifying the recommended action instruction by processing a data table that associates the known combinations of alerts with respective recommended action instructions.

6. The method of claim 5, wherein the recommended action instruction is identified based on a sequence in which the alerts were generated.

7. The method of claim 1, wherein a new recommended action is generated if none of the known combinations of alerts matches the set of alerts.

8. A process control instrument, comprising:
   an alert manager to:
      generate a set of alerts within a process control instrument;
      assign a descriptive indicator to at least one alert of the set of alerts, the descriptive indicator indicative of a process control system parameter deviating from a setpoint value, wherein a number of deviations from the setpoint value initiates detection of an event threshold, the event threshold a predetermined number of events required for alert activation;
      process the set of alerts to compare the set of alerts to known combinations of alerts; and
      determine if one of the known combinations of alerts matches the set of alerts based on a comparison of the set of alerts to the known combinations of alerts; and
   a recommended action generator to identify a recommended action instruction based on the determination.

9. The process control instrument of claim 8, wherein the alert manager is to process the set of alerts to compare the set of alerts to the known combinations of alerts by sequentially comparing each of the alerts composing the set of alerts to each of the alerts composing each of the known combinations of alerts.

10. The process control instrument of claim 9, wherein the alert manager is to determine if one of the known combinations of alerts matches the set of alerts by determining if a one-to-one matching correspondence exists between the alerts composing the set of alerts and one of the known combinations of alerts.

11. The process control instrument of claim 8, wherein the alert manager is to determine if one of the known combinations of alerts matches the set of alerts by processing, by the instrument, a data table that includes the known combinations of alerts.

12. The process control instrument of claim 8, wherein the recommended action generator is to identify the recommended action instruction by processing a data table that associates the known combinations of alerts with respective recommended action instructions.

13. The process control instrument of claim 12, wherein the recommended action instruction is identified based on a sequence in which the alerts were generated.

14. The process control instrument of claim 8, wherein a new recommended action instruction is generated, by the recommended action generator, if none of the known combinations of alerts matches the set of alerts.

15. A non-transitory computer readable storage medium comprising instructions that, when executed, cause a machine to at least:
generate a set of alerts within a process control instrument;
assign a descriptive indicator to at least one alert of the set of alerts, the descriptive indicator indicative of a process control system parameter deviating from a setpoint value, wherein a number of deviations from the setpoint value initiates detection of an event threshold, the event threshold a predetermined number of events required for alert activation;
compare the set of alerts to known combinations of alerts;
determine if one of the known combinations of alerts matches the set of alerts based on a comparison of the set of alerts to the known combinations of alerts; and
identify a recommended action instruction based on the determination.

16. The computer readable storage medium of claim 15, wherein the instructions, when executed, further cause the machine to process the set of alerts to compare the set of alerts to the known combinations of alerts by sequentially comparing each of the alerts composing the set of alerts to each of the alerts composing each of the known combinations of alerts.

17. The computer readable storage medium of claim 16, wherein the instructions, when executed, further cause the machine to determine if one of the known combinations of alerts matches the set of alerts by determining if a one-to-one matching correspondence exists between the alerts composing the set of alerts and one of the known combinations of alerts.

18. The computer readable storage medium of claim 15, wherein the instructions, when executed, further cause the machine to determine if one of the known combinations of alerts matches the set of alerts by processing a data table that includes the known combinations of alerts.

19. The computer readable storage medium of claim 15, wherein the instructions, when executed, further cause the machine to identify the recommended action instruction by processing a data table that associates the known combinations of alerts with respective recommended action instructions.

20. The computer readable storage medium of claim 19, wherein the recommended action instruction is identified based on a sequence in which the alerts were generated.

* * * * *